United States Patent
Itoh et al.

(10) Patent No.: US 7,961,953 B2
(45) Date of Patent: Jun. 14, 2011

(54) IMAGE MONITORING SYSTEM

(75) Inventors: Masaya Itoh, Hitachi (JP); Hiroshi Shojima, Hitachiota (JP); Hiromasa Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 803 days.

(21) Appl. No.: 12/023,051

(22) Filed: Jan. 31, 2008

(65) Prior Publication Data
US 2008/0317356 A1 Dec. 25, 2008

(30) Foreign Application Priority Data
Jun. 25, 2007 (JP) ................. 2007-165744

(51) Int. Cl.
*G06K 9/62* (2006.01)
(52) U.S. Cl. ........................ 382/209; 382/255
(58) Field of Classification Search .................. 382/100, 382/128, 144, 145, 149, 151, 181, 215, 218, 382/224, 255, 275, 294
See application file for complete search history.

(56) References Cited

U.S. PATENT DOCUMENTS

| | | | | |
|---|---|---|---|---|
| 6,091,846 A * | 7/2000 | Lin et al. | ........................ | 382/145 |
| 6,283,917 B1 * | 9/2001 | Jago et al. | ........................ | 600/437 |
| 6,483,938 B1 * | 11/2002 | Hennessey et al. | ........... | 382/149 |
| 7,676,077 B2 * | 3/2010 | Kulkarni et al. | ............... | 382/144 |
| 2009/0041314 A1 * | 2/2009 | Vercauteren et al. | ......... | 382/128 |

FOREIGN PATENT DOCUMENTS

| | | |
|---|---|---|
| JP | 2000-222646 | 8/2000 |
| JP | 2001-006056 | 1/2001 |
| JP | 2002-369224 | 12/2002 |
| JP | 2003-274390 | 9/2003 |
| JP | 2004-214926 | 7/2004 |
| JP | 2005-252479 | 9/2005 |
| JP | 2005-341295 | 12/2005 |
| JP | 2006-352644 | 12/2006 |

* cited by examiner

*Primary Examiner* — Yon Couso
(74) *Attorney, Agent, or Firm* — Antonelli, Terry, Stout & Kraus, LLP.

(57) ABSTRACT

In an image monitoring system, an image data acquisition unit takes in video signals from a camera to acquire image data. An image recognition unit carries out image recognition processing using an inputted image obtained from the image data acquisition unit. A reference image registration unit registers a reference image selected from among the inputted images. An image blur detection unit detects a difference in image blur between the reference image and the inputted image. A similarity computation unit computes a similarity between the reference image and the inputted image. A camera anomaly detection unit detects any anomaly in the camera from the difference in image blur and the similarity.

15 Claims, 5 Drawing Sheets

IMAGE MONITORING SYSTEM

CLAIM OF PRIORITY

The present application claims priority from Japanese application serial no. 2007-165744, filed on Jun. 25, 2007, the contents of which are hereby incorporated by references into this application.

FIELD OF THE INVENTION

The present invention relates to an image monitoring system having a function of capturing an image from an imaging device such as a camera, and detecting sabotage to a camera or image acquisition failure due to a defect in equipment.

BACKGROUND OF THE INVENTION

In general, image monitoring systems have a function of capturing an image from a camera, and detecting a moving object such as a human or a vehicle which appears in a monitored area by image recognition. By utilizing the result of the moving object detection, these image monitoring systems are capable of recording only an image in which a moving object appears, causing a display unit to display an alert icon, or sounding a buzzer to alert a guard. Therefore, they are useful for reducing a burden on watching service in which continuous check used to be required.

Further, the above-mentioned image monitoring systems bring the following advantage: when a crime, such as theft, occurs, it is possible to make good use of a recorded image to thereafter evidence the crime.

Meanwhile, criminals perform various acts on such image monitoring systems in an attempt to prevent an evidential image from being acquired, and this has become problematic. Such acts include changing the image pickup angle of a camera, placing an obstruction in front of a camera, and destroying a camera. Incidentally, in case that the imaging device itself falls in faulty, an image cannot be acquired and there is a possibility that the image monitoring system becomes useless. In this case, it is required to notify a responsible guard or the like of this anomaly in the equipment and repair the camera to restore the image monitoring system to a normal state.

As a method for coping with this problem, there is known the technique disclosed in JP-A-2000-222646. This method is such that a normal image of reference is held and an inputted image is compared with this image to detect any anomaly in a camera.

The method disclosed in JP-A-2000-222646 involves a problem. This method is based on amount of change in the brightness value of images as follows. In this method, first, determining is the ratio of pixels where a brightness difference value between the reference image and an inputted image varies by more than a predetermined value. When this ratio exceeds a predetermined value, it is determined that sabotage against the camera has been done and this is notified. This construction involves a problem. When sabotage is obvious, for example, an obstruction is placed or an angle of camera view is changed, an alert can be put out. However, in an event in which the situation is difficult to estimate, for example, when a pickup image blur occurs in a lens, there is a possibility that the system fails to put out an alert. ("Blur" cited in this specification refers to a state in which an image is not clear and bleary.) Conversely, when normal change, such as change in lighting conditions and a shift in the weather, occur, there is a possibility that erroneous alerts are frequently put out.

The invention has been made to solve the above problems. The invention is to provide an image monitoring system in which any anomaly in a camera can be properly detected even when an image blur, change in lighting conditions, or a shift in the weather occurs.

SUMMARY OF THE INVENTION

To solve the above problems, an image monitoring system of the invention includes: an image data acquisition unit for taking in video signals from one or more imaging devices such as a camera to acquire image data; a reference image registration unit for registering a reference image selected from among inputted image data from the image data acquisition units; an image blur detection unit for detecting a difference in image blur between the reference image and the inputted image; a similarity computation unit for computing the similarity between the reference image and the inputted image; and a camera anomaly detection unit for detecting any anomaly in the camera from the difference in the image blur and the similarity.

According to the invention, it is possible to provide an image monitoring system capable of detecting any anomaly in an image inputted from a camera even when an image blur, change in lighting conditions, or a shift in the weather occurs.

DETAILED DESCRIPTION OF THE PREFERRED EMBODIMENTS

First Embodiment

Figure 1:
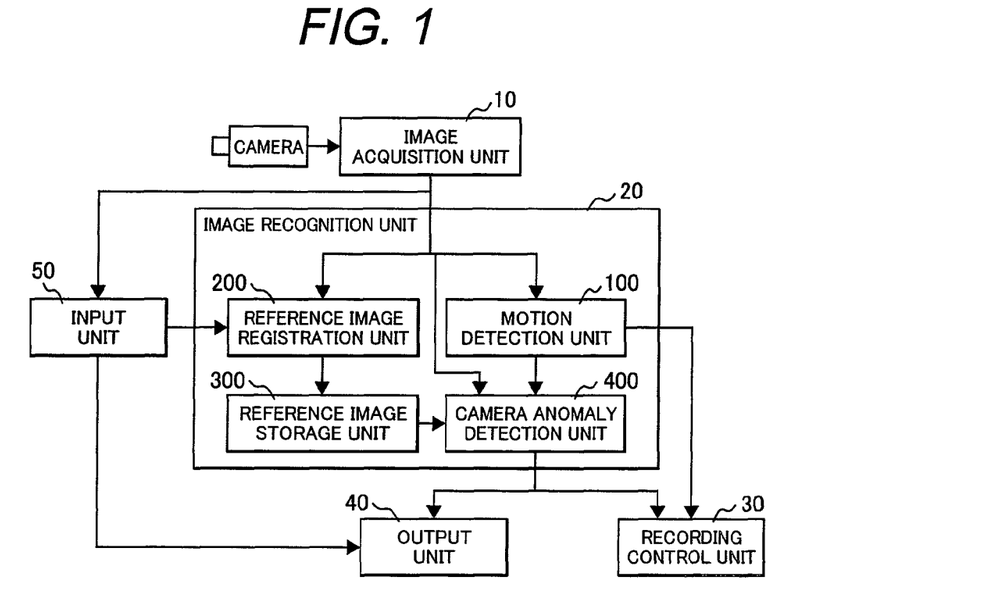
FIG. 1 is a drawing illustrating the overall configuration of an embodiment of the invention.

Hereafter, description will be given to an embodiment of the invention with reference to the drawings. FIG. 1 illustrates the configuration of an image monitoring system to which camera anomaly detection is applied. Its hardware is constructed of an electronic computer system having CPU, and various functions are carried out by respective units. The image monitoring system is constructed of: an image data acquisition unit 10 that acquires image data from video signals obtained from one imaging device such as a TV camera; an image recognition unit 20 that captures the image data from the image data acquisition unit 10 and carries out image recognition processing; a recording control unit 30 that controls recording, a data compression ratio of a recorded image, and recording intervals, by using a result of computation obtained by the image recognition unit 20; an output unit 40 that outputs a result of processing carried out by the image recognition unit 20 and an image from the image data acquisition unit 10 to a monitor or the like, and outputs an alert by sounding a buzzer or by other like means if required; and an input unit 50 for registering a reference image and inputting various set values through a user interface or the like.

The image data acquisition unit 10 takes in video signals from the camera in real time or takes in recorded video signals from a video recorder, and acquires one-dimensional array or two-dimensional array image data from those video signals. In order to reduce the influence of noise, flicker, or the like, this image data may be subjected to preprocessing such as smoothing filtering, edge enhancement filtering, or density conversion. Additionally, depending on usage, data format for RGB color, monochrome, or the like may be adopted. Further, in order to reduce a processing cost, image data may be reduced to a predetermined size.

The image recognition unit 20 is comprised of: a motion detection unit 100 for detecting motion in an image data captured from the image data acquisition unit 10; a reference image registration unit 200 for registering a reference image which is selected and set by the input unit 50 from among image data captured from the image data acquisition unit 10; a reference image storage unit 300 for holding the reference image registered by the reference image registration unit 200; and a camera anomaly detection unit 400 for detecting any anomaly in the camera from the following: a result of computation by the motion detection unit 100, the image data acquired by the image data acquisition unit 10, and a reference image held in the reference image storage unit 300.

Figure 2:
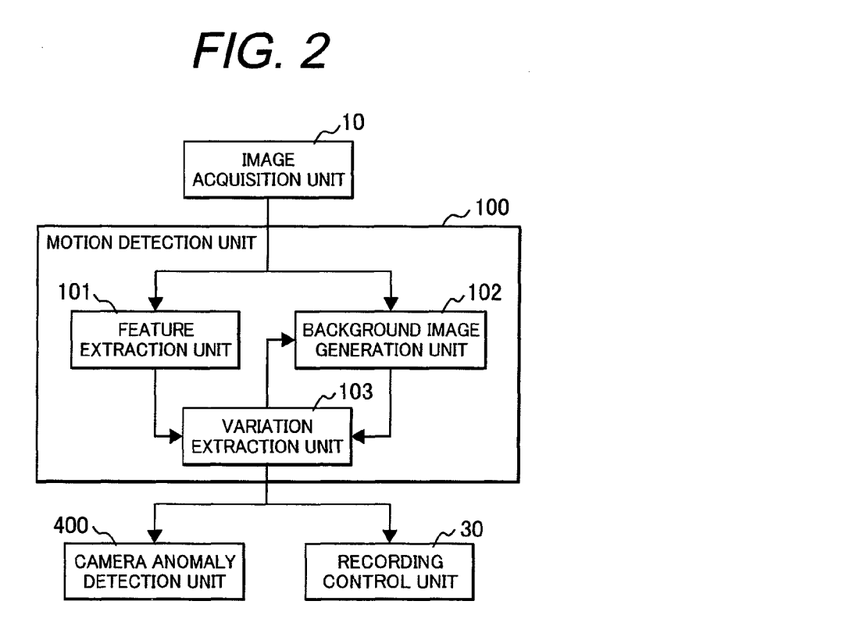
FIG. 2 is a drawing illustrating the configuration of a motion detection unit of the invention with a focus on the processing carried out by each part.

Detailed description will be given to processing carried out in the image recognition unit 20. FIG. 2 is a block diagram of the motion detection unit 100 illustrating internal processing carried out therein. The motion detection unit 100 is comprised of: a feature extraction unit 101 for extracting a feature from image data captured by the image data acquisition unit 10; a background image generation unit 102 for generating a background image to be a comparison criterion from image data captured by the image data acquisition unit 10; and a variation extraction unit 103 for comparing the feature in image data extracted by the feature extraction unit 101 with the background image to extract any variation.

As features obtained by the feature extraction unit 101, the following can be listed: lightness value and RGB value computed with respect to each pixel in an inputted image; feature amount computed by an arbitrary operator, for example, which is edge strength and direction computed by a differentiation filter such as a Sobel operator; and feature vector obtained by integrating them. The feature amounts are different in robustness against environmental fluctuation and detection accuracy and it is required to determine a feature amount corresponding to a situation. This embodiment selects a lightness value, which is most common.

Next, Description will be given to the background image generation unit 102. Images to be generated by the background image generation unit 102 do not embrace a moving object, and ideal images thereby generated are weather that changes from hour to hour or change in the environment, including lighting conditions. The reason for this is as follows: provided a moving object is embraced in a background image, and when a moving object and an inputted image data are compared with each other, there is a possibility that the moving object embraced in the background image is detected as a variation; and provided an environmental change is not taken account in the background image, there is a possibility that variations in lightness of the background image and lightness of inputted image data due to illumination are detected as a variation of the extracted feature. In order to cope with such situations, the background image generation unit 102 in this embodiment uses the following technique: a result of extraction obtained by the variation extraction unit 103 is utilized to statistical processing for carrying out to reconstruct the background image embracing no moving object. An example of the statistical processing is such that the background image generation unit 102 eliminates the influence of the moving object from images captured during a certain period by utilizing the feature extraction result from the variation extraction unit 103, and averages those images after eliminating the influence of the moving object. In stead of such a statistical processing, it is made possible for a guard to select a background image from among image data manually and register it. This makes it possible to generate a background image which does not embrace a moving object. Therefore, it is possible to generate the background image in account of environmental changes and thus detect the feature variation extracted by the variation extraction unit 103 with accuracy.

Incidentally, images in the camera differ according to isolation condition depending on weather or season. Therefore, the following measure can also be taken: multiple background images corresponding to respective situations are held; a background image to be used at present are selected automatically from among these multiple images and the present background image is automatically updated by the selected image according to information about time of day, season, or lightness. This makes it possible to reduce the frequency of erroneous alerts.

Next, description will be given to the variation extraction unit 103. Methods used by the variation extraction unit 103 include the following: a method of carrying out computation for the feature variation on a pixel-by-pixel basis; a method of carrying out determination for the feature variation in a local area including pixels of interest; and a method of expanding a criterion or the feature variation in the direction of a temporal axis according several frames of inputted images, etc. This embodiment adopts a computation method of obtaining the feature variation by a differential operation on a pixel-by-pixel basis. Hereafter, concrete description will be given to this computation method. When image data is two-dimensionally arranged, a pixel position p indicating arbitrary x-coordinate and y-coordinate is represented as p=(x,y). The lightness value of a background image at this pixel position p is expressed as $B_p$, and the lightness value of an inputted image is expressed as $I_p$. The amount of change $\Delta_p$ between the background image and the inputted image at the pixel position p is computed as $\Delta_p=B_p-I_p$. When $\Delta_p$ is equal to or higher than a predetermined threshold value, the pixel is determined to be in the feature variation. When this determination is carried out over the entire image, the region of the feature variation can be extracted as the region of a moving object. By the way, in per pixel, since each pixel can react to noise or the like, there is a possibility that the region of the feature variation (moving object) is over-detected or detected in a worm-eaten pattern. In order to cope with this, the region determined to be the feature variation is subjected to shaping by expanding or contracting extracted pixels. The result of extraction for the feature variation by the variation extraction unit 103 is outputted to the camera anomaly detection unit 400. It is also outputted to the recording control unit 30, and thus it is also possible to carry out recording control by motion detection.

Figure 3:
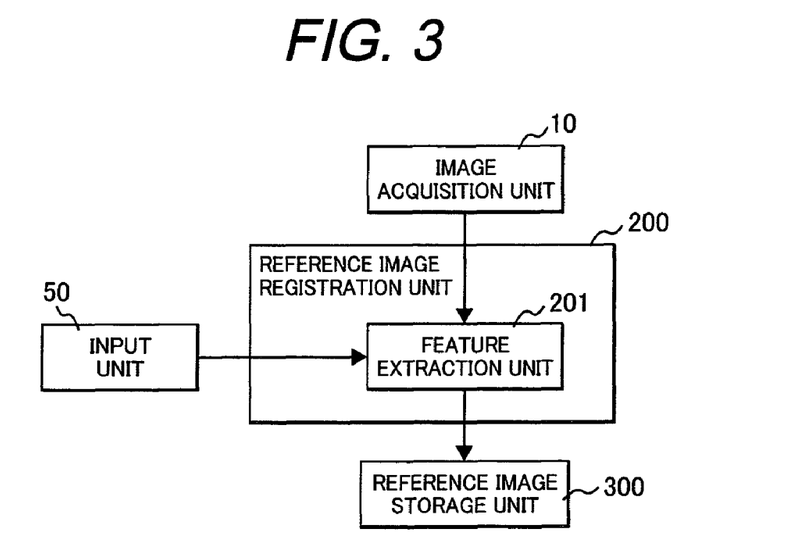
FIG. 3 is a drawing illustrating a reference image registration unit of the invention.
Figure 4:
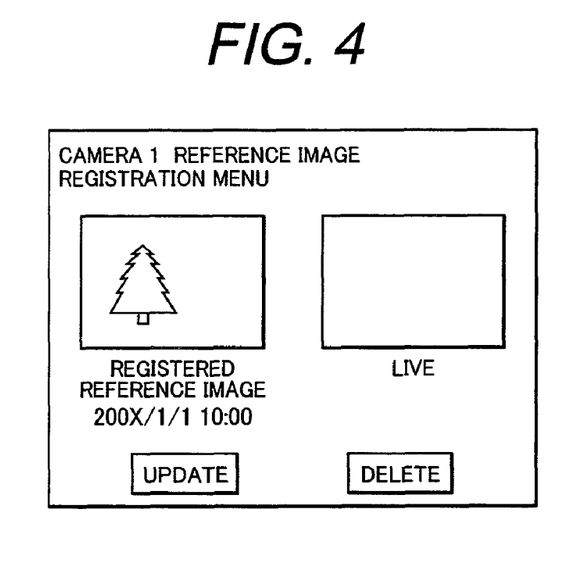
FIG. 4 is a drawing illustrating a user interface used when a reference image is registered in the invention.

Next, description will be given to the reference image registration unit 200 used for camera anomaly detection with reference to FIG. 3. Here, a feature of the reference image specified from the input unit 50 is acquired by the feature extraction unit 201, as with by the above-mentioned feature extraction unit 101. The reference image is an image representative of the monitored area where the monitoring camera is installed. The reference image can be made a choice, registered, and updated based on an image inputted live by a guard or maintenance personnel through the user interface illustrated in FIG. 4. This operation is performed through the input unit 50, and the image is displayed on the monitor by the output unit 40. The image registered here is stored in the reference image storage unit 300. With respect to the reference image, the same measure as in the background image generation unit 102 may be taken. That is, it may be automatically registered and updated so that it is an image embracing no moving object and take in account of weather that changes from hour to hour or change in the environment, including lighting conditions.

Figure 5:
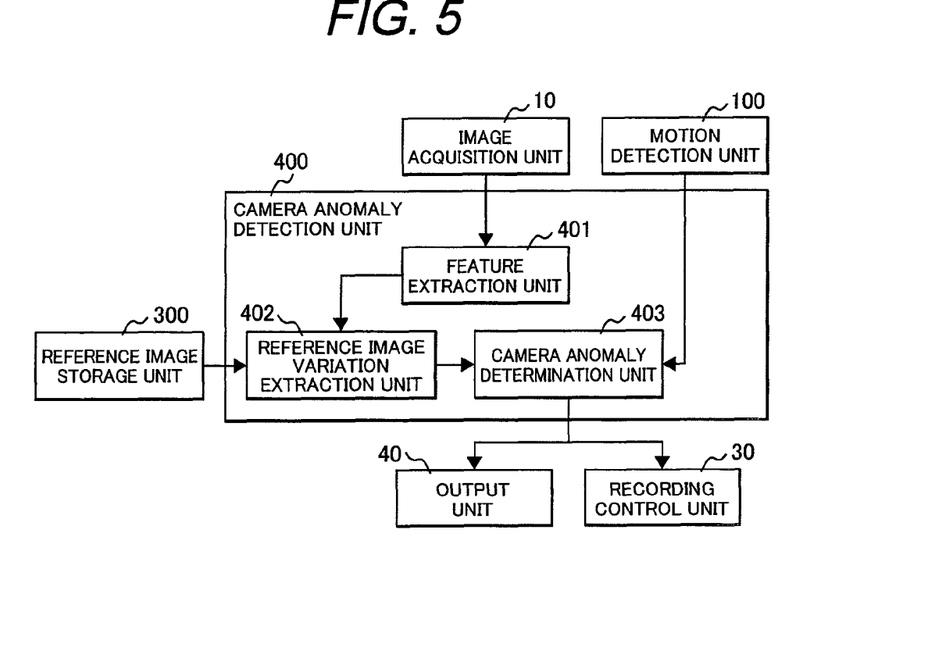
FIG. 5 is a drawing illustrating a camera anomaly detection unit of the invention.

Next, description will be given to the camera anomaly detection unit 400 with reference to FIG. 5. The camera anomaly detection unit 400 takes in data from the image data acquisition unit 10, reference image storage unit 300 and motion detection unit 100, and finally determines the degree of anomaly in the camera through a camera anomaly determination unit 403. First, a feature extraction unit 401 computes a feature of an inputted image. Outline information is effective in grasping the structure of an area to be monitored with accuracy. Therefore, edge enhancement is carried out through a differentiation filter for images, and the outline is taken as a feature amount. The brightness of an entire image is also information effective in camera anomaly detection; therefore, it is used together. The same result of feature amount computation is also held in the reference image storage unit 300. Then, the reference image variation extraction unit 402 detects any variation between the previously registered reference image and an inputted image from the feature extraction unit 401.

Detailed description will be give to the flow of this processing. An arbitrary position in an image is expressed as p=(x,y). The edge strength of a reference image at this position p is expressed as $B^{edge}_p$, and the edge strength of the inputted image is expressed as $I^{edge}_p$. Then, the difference in edge strength between the reference image and the inputted image at the pixel position p can be expressed as $\Delta^{edge}_p = B^{edge}_p - I^{edge}_p$. This difference is determined with respect to all pixels in the entire image, and all the results are added. The result of the addition is shown by the following [Expression 1], which represents the difference in edge strength between the reference image and the inputted image.

$$\Delta^{edge} = \Sigma \Delta^{edge}_p \qquad \text{[Expression 1]}$$

Further, the average values of the edge strength of the entire images are respectively expressed as $\overline{B}^{edge}$ and $\overline{I}^{edge}$. When there is a difference between them, it turns out that a blur has occurred in the camera as compared with normal camera images. The average difference in edge strength between the entire images is expressed by the following [Expression 2].

$$\overline{\Delta}^{edge} = \overline{B}^{edge} - \overline{I}^{edge} \qquad \text{[Expression 2]}$$

Aside from the foregoing, frequency analysis and the like are also effective means. When a high-frequency component is reduced, that can be determined as a blur.

Further, the similarity between images can be obtained by the difference $\overline{\Delta} = \overline{B} - \overline{I}$ in brightness average value between entire images or by correlation value computation such as normalized correlation computation indicated by [Expression 3].

$$\Delta_{cc} = \frac{\sum (I_p - \overline{I})(B_p - \overline{B})}{\sqrt{\sum (I_p - \overline{I})^2} \sqrt{\sum (B_p - \overline{B})^2}} \qquad \text{[Expression 3]}$$

Further, the result of detection by the motion detection unit 100 is utilized by the camera anomaly determination unit 403. To simply suppress erroneous motion detection due to the presence of a moving object within an image, it is effective to use a number of motion detection blocks $N^{motion}$ as an index for the camera anomaly determination, wherein the number of the motion detection blocks $N^{motion}$ is, for example, listed by an extent of the region of the moving object extracted by the motion detection unit 100, a number of pixels, or the like. Here, the above-mentioned difference in edge strength, difference in edge strength average, and similarity may be computed about an entire image or an image region excluding the region of a moving object extracted by the motion detection unit 100. The degree of camera anomaly $R_{alarm}$ determined by the anomaly determination unit 403 is indicated by [Expression 4].

$$R_{alarm} = \Delta^{edge} \overline{\Delta}^{edge} + \Delta_{cc} + N^{motion} \qquad \text{[Expression 4]}$$

As shown by [Expression 4], even when an image blur, change in lighting conditions, or change in the weather occurs, any camera anomaly can be appropriately determined by taking the following measure: the results of individual image comparison are integrated, and a predetermined threshold value determination is carried out.

Second Embodiment

Figure 6:
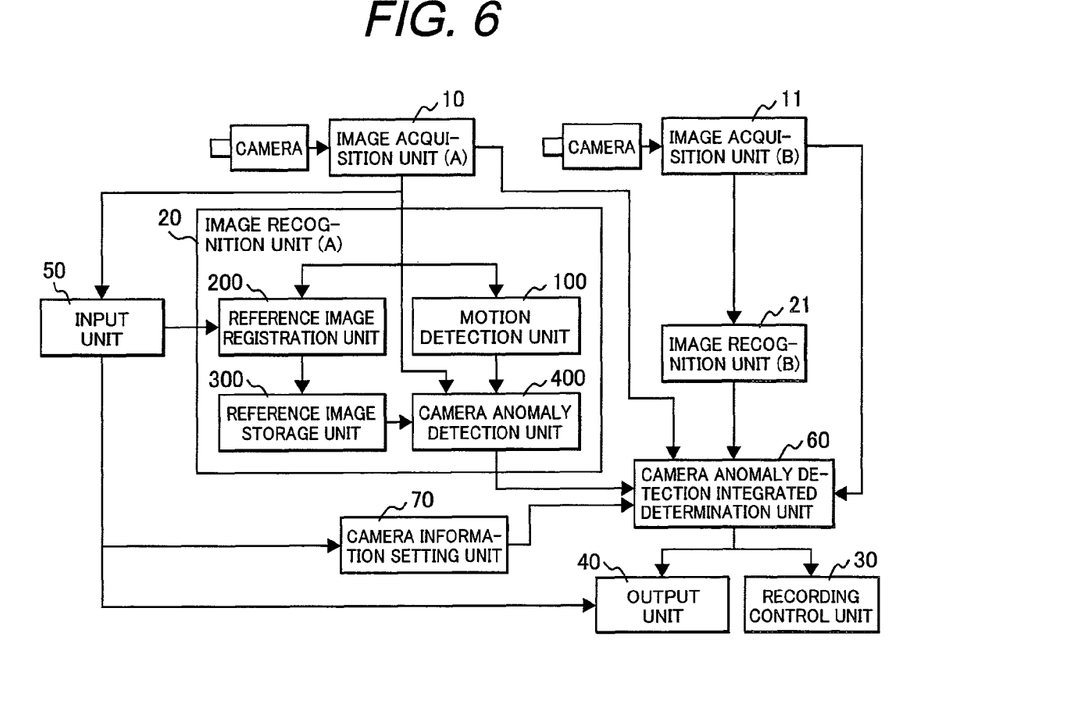
FIG. 6 is a drawing illustrating the overall configuration of an embodiment of the invention in which integrated determination is carried out using peripheral camera information in camera anomaly detection.

Description will be given to another embodiment with reference to FIG. 6. This embodiment relates to an image monitoring system of monitoring a target area by plural cameras which are installed on the periphery of the area. The plural cameras are generally called as peripheral cameras. In this embodiment, information from the peripheral cameras is used to further enhance the reliability of the above camera anomaly determination. Furthermore, the image monitoring system in FIG. 6 is configured by further adding the following to the construction of the above-precedent embodiment to: an image data acquisition unit 11, an image recognition unit 21, a camera anomaly detection integrated determination unit 60, and a camera information setting unit 70. In this embodiment, although the system so constructed that images can be inputted from two cameras the invention is also applicable to a system having three or more cameras.

Figure 7:
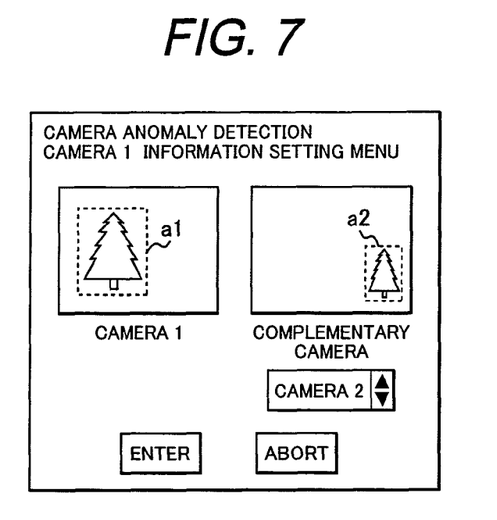
FIG. 7 is a drawing illustrating a user interface used when a complementary camera is set in the invention.

In comparison of a reference image from the reference image registration unit 200 with an inputted image, when a rapid change has occurred in the image pickup environment, the system may not always determined appropriately between the rapid change and sabotage to the camera provided that only one camera is used for the system. In order to cope with this, it is utilized that there is not so great a difference in the lightness of images, dispersion, color information, or the like between the images from peripheral cameras installed in the same monitored area provided that the monitored area is in normal. That is, when the camera anomaly detection unit 400 corresponding to one camera determines that the degree of camera anomaly $R_{alarm}$ is equal to or higher than a predetermined value, the following processing is carried out: a feature of an image acquired by the image data acquisition unit 10 and a feature of an image acquired by the image data acquisition unit 11 are compared with each other at the camera anomaly detection integrated determination unit 60; and a factor of certainty of camera anomaly determination by the camera anomaly detection unit 400 is thereby determined. A camera for complementing the image information of another camera is set by the input unit 50 and the camera information setting unit 70. As illustrated in FIG. 7, a camera for picking up an image of an area overlapping the area covered by another camera is set as a complementary camera. Then, one and the same object is specified. Thus, when either of cameras is obstructed by an object, it can be determined whether a camera is in abnormal state or a layout is changed. This setting is carried out by specifying an object a1, a2 as illustrated in FIG. 7.

Figure 8:
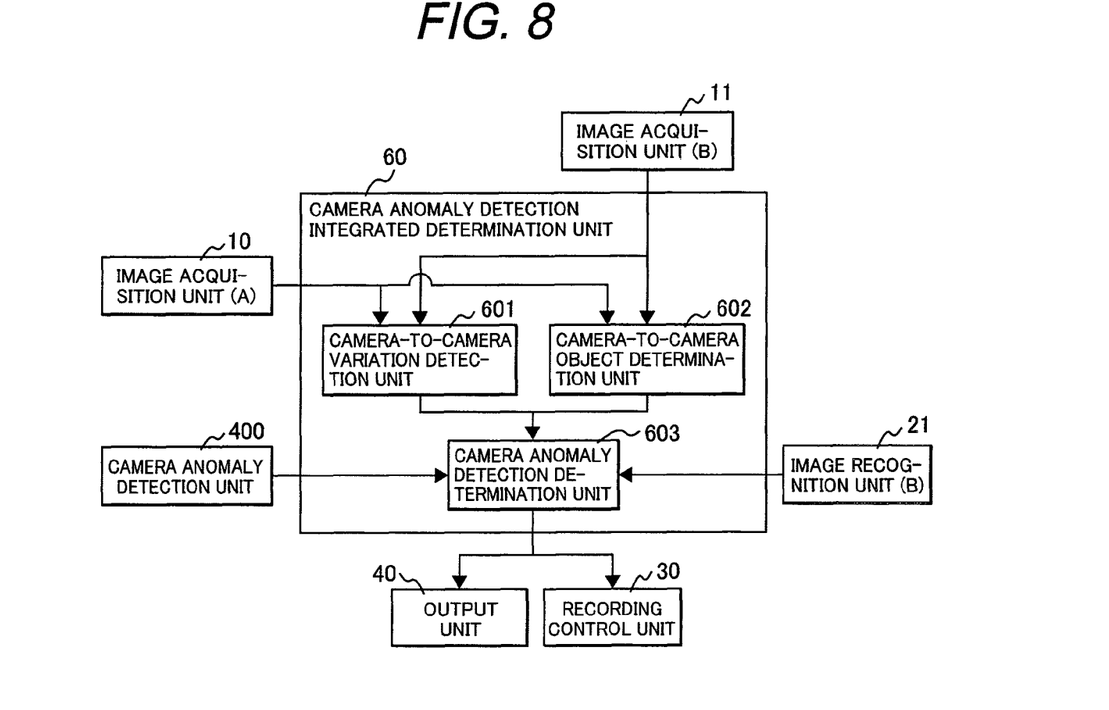
FIG. 8 is a drawing illustrating a camera anomaly detection integrated determination unit of the invention.

Description will be given to the camera anomaly detection integrated determination unit 60 with reference to FIG. 8. This description is on the assumption that in the image recognition unit 21, sabotage has not been committed against the image data acquisition unit 11 for acquiring images from the complementary camera. Using images acquired from the image data acquisition unit 10 and the image data acquisition unit 11, the degree of difference in object between the cameras is determined by a camera-to-camera variation detection unit 601 and a camera-to-camera object determination unit 602.

The camera-to-camera variation detection unit 601 compares basic information of the images. In the description of this embodiment, a case where the average brightness of the entire images is applied will be taken as an example. The variation in average brightness between the images can be computed as $\overline{A}=\overline{B}-\overline{I}$. When the variation is equal to or higher than a predetermined value, it is determined that there is a difference between the images.

The camera-to-camera object determination unit 602 determines whether or not the identical objects a1, a2 in FIG. 7 exist in the identical area using pattern matching for images. There are various pattern matching methods applicable to comparison computation. This embodiment adopts simplest SAD (Sum of Absolute Difference). In SAD, the respective brightness values in a pixel position p are taken as $A1_p$ and $A2_p$. Letting the total number of pixels in each image data be M, the similarity S can be computed as $S=\Sigma|A1_p-A2_p|/M$. When an object exists in the complementary camera but does not in the image data acquisition unit 10, there is a high possibility that the camera is obstructed or some other like even has occurred.

A camera anomaly determination unit 603 determines a camera anomaly by using the following: a difference information between the cameras, which is determined by the camera-to-camera variation detection unit 601 and the camera-to-camera object determination unit 602, and the result of detection by the camera anomaly detection unit 400. The result of determination is transferred to the output unit 40 and the recording control unit 30. When some camera is determined to be abnormal, the recording control unit 30 can also carry out processing to start recording of an image acquired by a peripheral camera.

Use of plural camera images to determine any anomaly in a camera as in this embodiment brings the following advantage: when rapid change occurs in the image pickup environment or sabotage is committed against a camera, that can be appropriately determined. Further, when some camera is determined to be abnormal, the following can be implemented: recording of an image acquired by a peripheral camera is started; and it is thereby made possible to complement information of the camera that is abnormal and cannot acquire a normal image by the peripheral camera.

Third Embodiment

Figure 9:
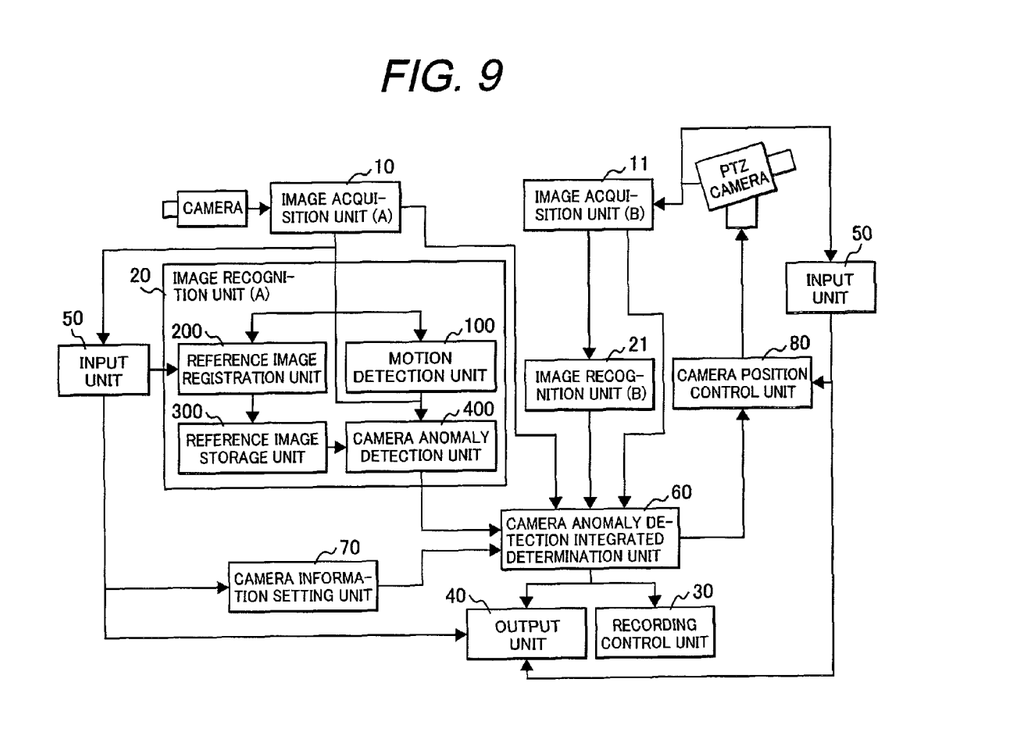
FIG. 9 is a drawing illustrating an embodiment of the invention in which peripheral camera control is added.
Figure 10:
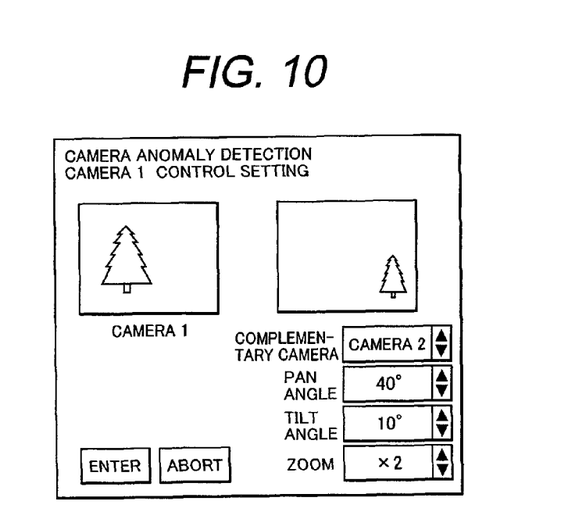
FIG. 10 is a drawing illustrating a user interface used when a camera setting value is changed in the invention.

When a camera is determined to be abnormal in camera anomaly detection in the above embodiment, an image cannot be picked up by that camera any more. To cope with this, the image pickup range can be complemented by a peripheral camera. Description will be given to an image monitoring system additionally provided with this function with reference to FIG. 9. This embodiment is constructed by adding a camera with PTZ (Pan/Tilt/Zoom) functions and a camera position control unit 80 to the above second embodiment. When camera 1 is determined to be abnormal by the camera anomaly detection integrated determination unit 60 with preset PTZ, the following processing is carried out: the PTZ setting is changed based on the complementing setting effective when the camera anomaly occurred, and it is thereby made possible to complement the image pickup range of camera 1 where the camera anomaly occurred. More specific description will be given. When a camera is determined to be abnormal, it is made possible to pick up an image in the direction covered by the camera determined to be abnormal based on a predetermined parameter of a preset complementary camera. The PTZ setting effective when a camera is abnormal can be changed through the user interface illustrated in FIG. 10. That is, a camera that should be used to complement the image pickup range of camera 1 is selected, and a pan angle, tilt angle, and zoom setting value for determining the image pickup range of that camera are set. Based on these set values, the camera position control unit 80 changes the camera setting of the PTZ camera.

When any anomaly in some camera is detected, as mentioned above, the image pickup range of a peripheral camera is so set as to complement the image pickup range of the abnormal camera. Thus, the image pickup range of the monitoring camera in which an anomaly has occurred can be more reliably complemented. Therefore, it is possible to provide a monitoring system robust against sabotage against a camera.

According to the above-mentioned embodiments, it is possible to detect any anomaly in an image inputted from a camera and to display it on a monitor or send out a warning to alert a guard. Even if sabotage is committed against a camera, it is possible to prevent missing picking up an image of the crime. Therefore, the invention is especially effective for monitoring systems prone to sabotage against a camera.

What is claimed is:

1. An image monitoring system comprising:
   an image data acquisition unit for taking in video signals from a camera to acquire image data; and
   an image recognition unit for carrying out image recognition processing using an inputted image obtained from the image data acquisition unit,
   wherein the image recognition unit includes:
   a reference image registration unit for registering a reference image selected from among the inputted images;
   an image blur detection unit for detecting a difference in image blur between the reference image and the inputted image;

a similarity computation unit for computing a similarity between the reference image and the inputted image; and a camera anomaly detection unit for detecting any anomaly in the camera from the difference in image blur and the similarity.

2. The image monitoring system according to claim 1, wherein the image blur detection unit detects a difference in the image blur by comparison of the reference image with the inputted image for edge strength or by a frequency analysis.

3. The image monitoring system according to claim 1, wherein the similarity computation unit computes the similarity from a difference in brightness value or a correlation value.

4. An image monitoring system comprising:

an image data acquisition unit for taking in video signals from a camera to acquire image data; and an image recognition unit for carrying out recognition processing using an inputted image obtained from the image data acquisition unit, wherein the image recognition unit includes:

a reference image registration unit for registering a reference image selected from among the inputted images;

a motion detection unit for acquiring motion detection information from the inputted image;

an image blur detection unit for detecting a difference in image blur between the reference image and the inputted image;

a similarity computation unit for computing a similarity between the reference image and the inputted image; and a camera anomaly detection unit for determining any anomaly in the camera from the motion detection information, the difference in image blur, and the similarity.

5. The image monitoring system according to claim 4, wherein the motion detection unit automatically generates a background image from the inputted image, and wherein the motion detection unit acquires the motion detection information by comparison of the background image with the inputted image.

6. The image monitoring system according to claim 4, wherein the image blur detection unit detects a difference in image blur by comparison of the reference image with the inputted image for edge strength or a frequency analysis.

7. The image monitoring system according to claim 4, wherein the similarity computation unit computes the similarity by a difference in brightness value or a correlation value.

8. An image monitoring system comprising:

two or more cameras including a first camera and second camera;

two or more image data acquisition units for taking in video signals from the cameras to acquire two or more image data; and an image recognition unit for carrying out image recognition processing using inputted images obtained from the image data acquisition units, wherein the image recognition unit includes:

a reference image registration unit for registering a reference image from among first inputted images from the first camera;

an image blur detection unit for detecting an image blur in the first inputted image and the reference image;

a similarity computation unit for computing a similarity between the first inputted image and the reference image; and a camera anomaly detection unit for determining any anomaly in the first camera from a second inputted image from the second camera, the image blur, and the similarity.

9. The image monitoring system according to claim 8, wherein the image blur detection unit detects the image blur by comparison of the reference image with the inputted image for edge strength or by a frequency analysis.

10. The image monitoring system according to claim 8, wherein the similarity computation unit computes the similarity by a difference in brightness value or a correlation value.

11. The image monitoring system according to claim 8, wherein the image recognition unit includes:

a motion detection unit for acquiring motion detection information from the inputted image, and wherein the camera anomaly detection unit uses the motion detection information in camera anomaly determination.

12. The image monitoring system according to claim 11, wherein the motion detection unit automatically generates a background image from the first inputted image, and wherein the motion detection unit acquires the motion detection information by comparison of the first inputted image with the background image.

13. The image monitoring system according to claim 8, wherein when one and the same object exists in the image pickup ranges of the first camera and the second camera, the camera anomaly detection unit uses the object being embraced both in the first inputted image and in the second inputted image in camera anomaly determination.

14. The image monitoring system according to claim 8, wherein when the camera anomaly detection unit detects any anomaly in a camera, the monitored area of each camera other than the first camera is shifted to the direction in which the monitored area of the first camera is complemented.

15. The image monitoring system according to claim 8, wherein when the camera anomaly detection unit detects any anomaly in a camera, recording of an inputted image from each camera other than the first camera is started.

* * * * *